(12) United States Patent
Dangi et al.

(10) Patent No.: US 11,010,409 B1
(45) Date of Patent: May 18, 2021

(54) MULTI-STREAMING WITH SYNTHETIC REPLICATION

(71) Applicant: EMC Corporation, Hopkinton, MA (US)

(72) Inventors: Salil Dangi, Mission Viejo, CA (US); Harshadrai Parekh, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 353 days.

(21) Appl. No.: 15/084,398

(22) Filed: Mar. 29, 2016

(51) Int. Cl.
*G06F 16/27* (2019.01)
*H04L 29/08* (2006.01)
*G06F 16/2455* (2019.01)

(52) U.S. Cl.
CPC ...... *G06F 16/275* (2019.01); *G06F 16/24568* (2019.01); *H04L 67/06* (2013.01)

(58) Field of Classification Search
CPC ......... G06F 17/30581; G06F 17/30516; G06F 16/275; G06F 16/24568; H04L 67/06
USPC ......................................................... 707/624
See application file for complete search history.

(56) References Cited

U.S. PATENT DOCUMENTS

| | | | | |
|---|---|---|---|---|
| 5,588,147 A * | 12/1996 | Neeman | ................. | G06F 16/184 |
| 5,802,301 A * | 9/1998 | Dan | ........................ | G06F 3/061 |
| | | | | 709/223 |
| 6,374,336 B1 * | 4/2002 | Peters | ................. | G06F 11/1076 |
| | | | | 711/167 |
| 8,825,653 B1 * | 9/2014 | Wang | .................. | G06F 11/3414 |
| | | | | 707/737 |
| 8,909,605 B1 * | 12/2014 | Li | ...................... | G06F 16/24568 |
| | | | | 707/681 |
| 8,984,097 B1 * | 3/2015 | Shyam | .................. | G06F 16/178 |
| | | | | 709/218 |
| 9,026,696 B1 * | 5/2015 | Natanzon | ............ | G06F 11/2074 |
| | | | | 710/52 |
| 9,110,910 B1 * | 8/2015 | Li | ........................ | G06F 11/1448 |
| 9,235,524 B1 * | 1/2016 | Derbeko | ............. | G06F 12/0866 |
| 9,405,481 B1 * | 8/2016 | Cohen | .................. | G06F 11/1469 |
| 9,405,765 B1 * | 8/2016 | Natanzon | ................ | G06F 11/14 |
| 9,519,550 B1 * | 12/2016 | Caban | .................. | G06F 11/1458 |
| 9,811,431 B1 * | 11/2017 | Natanzon | ................ | G06F 16/27 |
| 9,852,140 B1 * | 12/2017 | Li | ........................ | G06F 16/1734 |
| 2002/0120763 A1 * | 8/2002 | Miloushev | .......... | H04L 67/1023 |
| | | | | 709/230 |
| 2004/0098425 A1 * | 5/2004 | Wiss | ...................... | G06F 16/275 |
| 2005/0262097 A1 * | 11/2005 | Sim-Tang | ............. | G06F 16/125 |

(Continued)

*Primary Examiner* — Ashish Thomas
*Assistant Examiner* — Nargis Sultana
(74) *Attorney, Agent, or Firm* — Womble Bond Dickinson (US) LLP (57) ABSTRACT

According to one embodiment, a request is received to replicate a plurality of ranges of a source file from a source storage system to a target storage system, where the request specifies a first range of the source file and a second range of the source file. A first replication stream and a second replication stream of a replication session are established with the target storage system. First data of the first range and the second data of the second range from the source file are directly read from the source file, without creating separate files for storing the first data and the second data. The first data and second data are transmitted to the target storage system via the first stream and the second stream respectively in parallel.

12 Claims, 7 Drawing Sheets

(56) References Cited

U.S. PATENT DOCUMENTS

| | | | | |
|---|---|---|---|---|
| 2006/0161810 A1* | 7/2006 | Bao | G06F 11/2082 | 714/6.12 |
| 2006/0195670 A1* | 8/2006 | Iwamura | G06F 11/2058 | 711/162 |
| 2007/0185932 A1* | 8/2007 | Teodosiu | G06F 16/184 | |
| 2007/0198605 A1* | 8/2007 | Saika | G06F 16/128 | |
| 2007/0220311 A1* | 9/2007 | Lewin | G06F 11/1471 | 714/6.32 |
| 2007/0266053 A1* | 11/2007 | Ahal | H04L 67/1097 | |
| 2007/0294321 A1* | 12/2007 | Midgley | G06F 11/1464 | |
| 2008/0181438 A1* | 7/2008 | Beckinger | H04S 3/00 | 381/300 |
| 2009/0196288 A1* | 8/2009 | Li | H04L 49/90 | 370/390 |
| 2010/0192220 A1* | 7/2010 | Heizmann | G06F 21/6254 | 726/19 |
| 2011/0167234 A1* | 7/2011 | Nishibori | G06F 11/1456 | 711/162 |
| 2011/0238937 A1* | 9/2011 | Murotani | G06F 3/0689 | 711/162 |
| 2012/0130950 A1* | 5/2012 | Jain | G06F 16/184 | 707/634 |
| 2013/0024722 A1* | 1/2013 | Kotagiri | G06F 11/1004 | 714/6.1 |
| 2013/0073519 A1* | 3/2013 | Lewis | G06F 3/0641 | 707/610 |
| 2013/0110778 A1* | 5/2013 | Taylor | G06F 11/1435 | 707/624 |
| 2013/0117223 A1* | 5/2013 | Niki | G06F 16/185 | 707/610 |
| 2013/0124464 A1* | 5/2013 | Rank | G06F 16/27 | 707/610 |
| 2013/0173553 A1* | 7/2013 | Apte | G06F 11/1453 | 707/640 |
| 2013/0325824 A1* | 12/2013 | Shoens | G06F 16/16 | 707/698 |
| 2014/0181039 A1* | 6/2014 | Harrison | G06F 16/164 | 707/652 |
| 2014/0181441 A1* | 6/2014 | Kottomtharayil | G06F 3/0649 | 711/162 |
| 2014/0201144 A1* | 7/2014 | Vibhor | H04L 67/18 | 707/634 |
| 2014/0215546 A1* | 7/2014 | Willis | H04N 21/2187 | 725/118 |
| 2015/0032978 A1* | 1/2015 | Bashyam | G06F 16/1752 | 711/162 |
| 2015/0106802 A1* | 4/2015 | Ivanov | G06F 9/45558 | 718/1 |
| 2016/0077925 A1* | 3/2016 | Tekade | G06F 3/065 | 707/654 |
| 2016/0080488 A1* | 3/2016 | Battepati | H04L 67/06 | 709/217 |
| 2016/0210308 A1* | 7/2016 | Shekhar | G06F 3/065 | |
| 2016/0285957 A1* | 9/2016 | Haserodt | H04L 67/1097 | |
| 2017/0060702 A1* | 3/2017 | Dave | G06F 11/1441 | |
| 2017/0235805 A1* | 8/2017 | Shetty | G06F 16/178 | 707/634 |

* cited by examiner

MULTI-STREAMING WITH SYNTHETIC REPLICATION

FIELD OF THE INVENTION

Embodiments of the present invention relate generally to data storage systems. More particularly, embodiments of the invention relate to multi-streaming with synthetic replication.

BACKGROUND

On storage systems, a file replication occurs over a single connection such that the total time taken to replicate a file is constrained by the replication protocol efficiency over the single connection, and size of a file plays a big role in time taken. Even if the system and network configuration can support multiple concurrent connections, a single file replication between two storage systems still occurs over a single connection.

Figure 1:
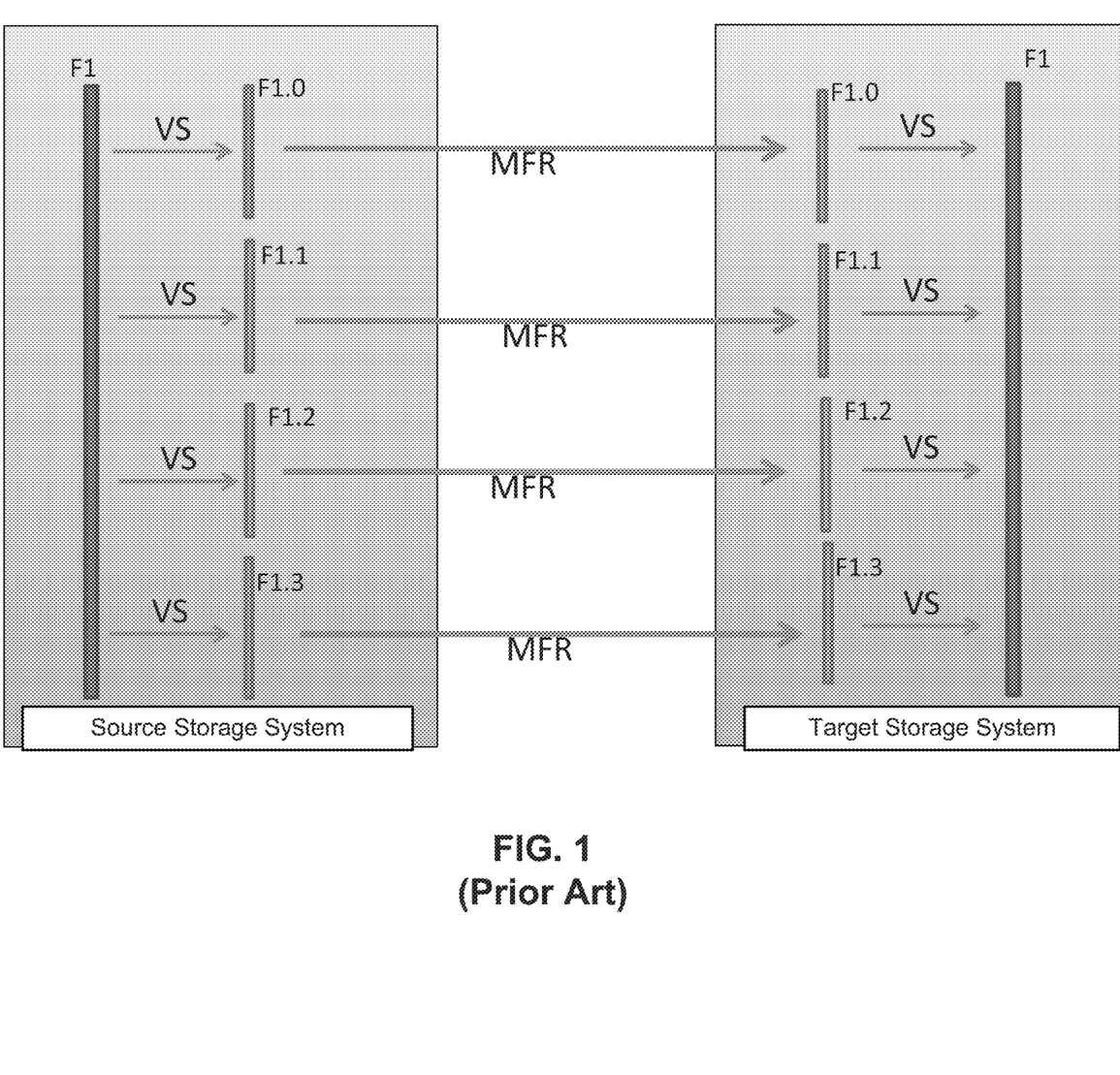
FIG. 1 is a diagram illustrating a conventional replication process.

This problem was previously addressed at the backup software level, in which a conventional storage system exploits the available concurrency by slicing a large to-be-replicated file (e.g., source file, F1) into multiple smaller files (e.g., F1.0, F1.1, F1.2, and F1.3) on a source storage system, as shown in FIG. 1. These slices are replicated in parallel to a target storage system. The slices are then stitched back together to form a target file (e.g., F1) at the target storage system. The mechanism works well and improves replication performance for large files based on the level of parallelism used. However, it falls short of taking advantage of virtual synthetic replication (VSR) for virtual synthetic (VS) datasets.

The VS files are synthesized from the existing base files, and this synthesis information is captured and recorded with the VS file. When the source storage system slices this VS file into smaller files, these smaller files have lost the synthesis information from the original VS file, and replication cannot take advantage of the VSR optimization.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided such that a backup or replication software can request replication of only a range of file (referred to as range replication), then it can eliminate the extra step of slicing the large source file into smaller files. The data of a range of a source file can be directly read from an offset of the source file and replicated to a target storage system, without having to extracting the data into a separate small file. If replication is still using the original file as the source file (even though each request is replicating only a range or portion of that file), the synthesis information would not be lost. The replication is able to take advantage of VSR optimization. This range replication mechanism improves the current mechanism for non-VS datasets too as it does not need to create file slices on the source storage system.

In one embodiment, an application programming interface (API) is provided to allow a client to specify and submit a replication request, including a source file, a range of the source file (e.g., an offset and length), a target storage system, a target file (e.g., replica of the source file), and a location (e.g., offset) within the target file to which the range of source file to be replicated and stored. In response to the request, a stream of a replication session is established with the specified target storage system, the range of the source file is then read directly from the source file and streamed to the target storage system. In response to the range of the source file received from the source storage system, the target storage system places the range of the source file at the specified location of the specified target file. The entire source file can be partitioned into multiple ranges or sections, and each of the ranges can be replicated via a respective stream to the target storage system. The target storage system can integrate or merge the received ranges of the source file together to form the target file as a replica of the source file.

Figure 2:
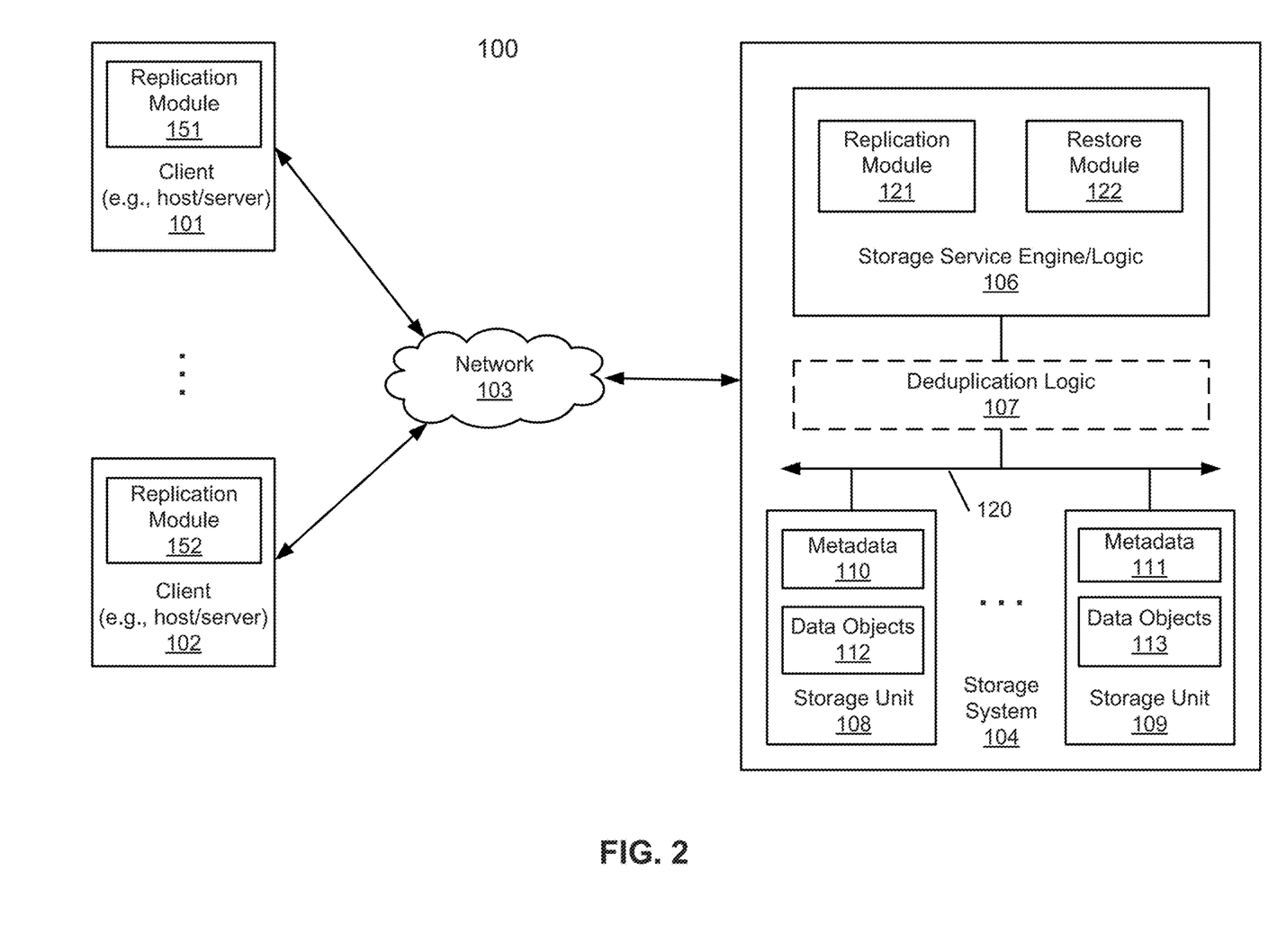
FIG. 2 is a block diagram illustrating a storage system according to one embodiment of the invention.

FIG. 2 is a block diagram illustrating a storage system according to one embodiment of the invention. Referring to FIG. 2, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup/replication module or logic 121 and restore logic 122. Backup/replication logic 121 is configured to receive and back up or replicate data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 2, any of clients 101-102 may further include an optional deduplication logic (not shown) having at least a portion of functionalities of deduplication logic 107. The deduplication logic is configured to perform local deduplication operations, respectively. For example, prior to transmit data to storage system 104, each of the deduplication logic may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, the deduplication logic is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In the example shown, source storage system 101 replicates data to a target storage system 104 over network 103. Data may be replicated from source storage system 101 to target storage system 104, for example, to provide disaster recovery protection, e.g., by enabling data backed up to be recovered from target storage system 104 if source storage system 101 were to become unavailable.

In one embodiment, replication of data from source storage system 101 to target storage system 104 over network 103 is performed at least in part by sending from source storage system 101 to target storage system 104 a set of fingerprints or other data representative of data segments comprising a file, and receiving an indication of which data segments the target storage system 104 does not already have stored. The missing segments are then sent from source storage system 101 to target storage system 104 via network 103.

In one embodiment, source storage system 101 is configured to determine a base file relationship between a file that is created at source storage system 101 by making a full/partial copy of another file, on the one hand, and a base file with which the newly-created file is associated. In various embodiments, the determination may be based at least in part on a file operation associated with the file, e.g., a file copy operation. In various embodiments, source storage system 101 determines programmatically a base file for the file, and stores persistently data reflecting the generational relationship between the base file and the file. For example, a tuple or other data that associates the base file with the created file may be stored in a table or other data structure. In some embodiments, a base file attribute of an object or other data structure used to hold file metadata may be set to an identifier or other value associated with the base file.

In one embodiment, the persistently stored data indicating the base file relationship may be used to perform a subsequent operation more efficiently, e.g., a replication operation such as described above. For example, in some embodiments, a base file relationship may be used to determine efficiently that certain segments comprising a file have already been replicated to a replication target, e.g., target storage system 104 in the example shown in FIG. 2. For example, if data segments common to a file and its base file have already been replicated in connection with replication of the base file, for example and without limitation, in some embodiments it may not be necessary to send corresponding fingerprints from the source storage system 101 to the target storage system 104, for example, since it can be determined based on the base file relationship that the segments common to the file and its base file have already been sent.

The time required to replicate data from the source storage system 101 to the target storage system 104 is constrained by the performance of the network 103 connecting the two data storage systems. Under certain circumstances, transferring data over the network 103 over multiple connections may improve the total data transfer rate compared to transferring data over a single connection. Therefore, for example, when a large file is to be transferred from the source storage system 101 to the target storage system 104, it may be advantageous to transfer different parts of the file concurrently over multiple connections and then reassemble the data at the destination, rather than serially transferring the file from beginning to end over a single connection.

A virtual synthetic file appears as a regular file to a user, but is physically stored at the data storage system in a form that comprises base files and synthesis information (e.g., base file relationships, other metadata, etc.). A feature known as virtual synthetic replication can be utilized to replicate a virtual synthetic file from a source data storage system to a destination data storage system. With virtual synthetic replication, the synthesis information is leveraged so that same data is not transferred more than once, thereby reducing the amount of data that needs to be transferred and the time required to transfer the data.

However, conventionally, virtual synthetic replication does not work with multi-streaming because when a client requests that the virtual synthetic file be sliced and the smaller files be created, the original synthesis information would be lost. These small files would indicate a different base since they were virtually synthesized from the larger parent. For example, if file F1 indicates that file F0 is its base file and file F0 is present on the target, file F1 can be replicated very quickly as only the new parts of file F1 need to be really replicated. However, F1.1/F1.2/F1.3 indicate that F1 is their base file, so F1.1/F1.2/F1.3 cannot be efficiently replicated since the base file F1 is not on the target. As the synthesis information is lost, the benefits of virtual synthetic replication can no longer be realized.

To take advantage of the benefits of both multi-streaming and virtual synthetic replication, in one embodiment, the source and destination data storage systems may allow for the replication of only a subpart of a file as specified by a range. Therefore, a file does not need to be sliced and smaller files need not be created in order to take advantage of concurrent data transfers: a client may simply request that multiple non-overlapping subparts of the file be replicated concurrently. At the same time, if the file to be replicated is a virtual synthetic file, because the replication is performed on the original virtual synthetic file itself rather than the rehydrated smaller files, the synthesis information is preserved during the replication process and its benefits can be realized. Therefore, the source and destination data storage systems (including their file systems) may allow a subpart of a file as specified by a range to be read, written, or replicated, etc.

Referring back to FIG. 2, in one embodiment, each of storage systems 101-102 includes a replication module (e.g., replication modules or replication agents 151-152) to replicate ranges of a source file to storage system 104 as a target storage system. For example, for the purpose of illustration, it is assumed client 101 as a source storage system attempts to replicate a source file to storage system 104 as a target storage system. Replication module 151 will receive a request to replicate portions (also referred to as subpart of the source file) to target storage system 104. The request may be received via a communication interface (e.g., API, Web portal, command-line interface or CLI) from a management console of an administrator or a backup/replication management server. The request may include information specifying at least a source file to be replicated, a range of the source file to be replicated (e.g., offset, length), a target storage system identifier (ID) (e.g., storage system 104, a target file, and a storage location of the target file (e.g., offset within the target file). In one embodiment, a request may specify multiple ranges of the source file or alternatively, multiple requests may be received, one for each range.

In response to the request(s), replication module 151 loads and opens the source file, for example, in a system memory. Replication module 151 identifies the requested range(s) and establishes one or more replication streams of a replication session with target storage system 104. Replication module 151 then directly reads from the system memory and transmits range(s) of the source file to target storage system 104 concurrently via the corresponding replication steams of the replication session, without having to slicing the source file into sub-files. Each replication stream may be established with target storage system based on replication stream metadata specifying at least a target file (e.g., filename or file ID), starting offset of the target file, and the size of the corresponding range of the source file. In response, replication module 121 of target storage system 104 can integrate multiple ranges of the source into a single target file based on the stream metadata of each replication stream, as shown in FIG. 3.

As a result, the synthesis information would not be lost during the replication, contrary to the conventional systems. In a conventional system, assuming that file f2 was built from file f0 and file f1 using VS. File f0 could have been ABCD and file f1 could have been WXYZ and file f2 is AWBXJCYDZ with J being the new component. File f2 now has the base files info of files f0 and f1. If file f2 is sliced into files f2.1, f2.2, and f3.3 (using VS), having AWB, XJC, and YDZ respectively via VS, then files f2.1/f2.2/f2.3 would have file f2 as the base files. Files f2.1/f2.2/f2.3 do not know that these can be built from files f0 and f1.

One of the goals of embodiments of the invention is to replicate file f2. If we replicate file f2 directly, it can use files f0/f1 on target 104 to rebuild file f2. If we replicate files f2.1/f2.2/f2.3, target 104 cannot build them since file f2 is not there, where source file f2 is AWBXJCYDZ. We can also build target file (e.g., f2_new) as ABCDJWXYZ by spinning multiple range replications and keeping the source and target begin offsets to be different.

Figure 3:
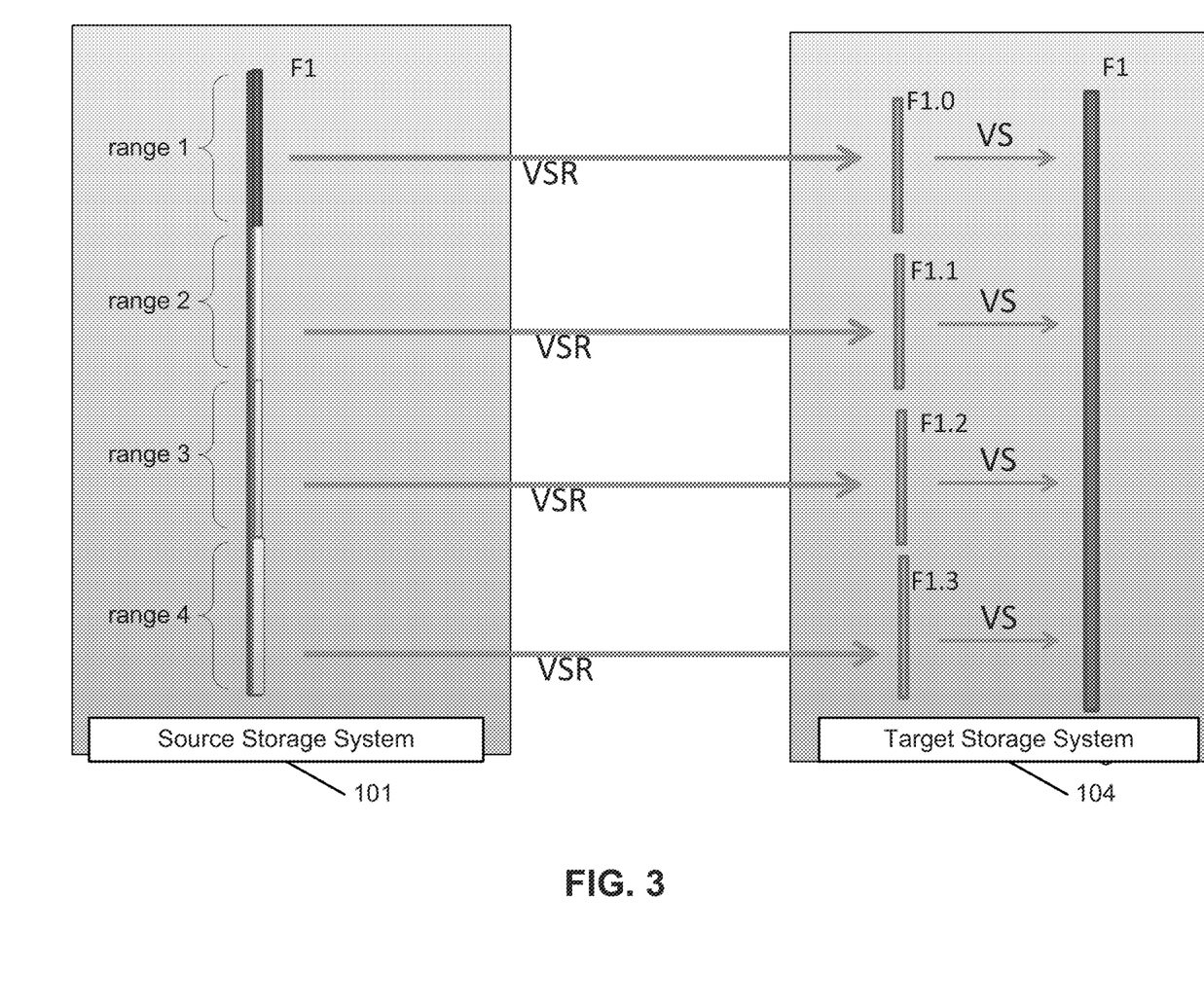
FIG. 3 is a diagram illustrating a multi-stream replication process according to one embodiment of the invention.

Referring now to FIG. 3, in this example, source file F1 is replicated from source storage system 101 to target storage system 104 via multiple replication streams in parallel. Each replication stream replicates one of the ranges of source file F1, for the purpose of illustrations, ranges 1-4. When ranges 1-4 of source file F1 reach target storage system 104, they are received as files F1.0, F1.1, F1.2, and F1.3, respectively. These files F1.0, F1.1, F1.2, and F1.3 are then incorporated into a single target file F1 at target storage system 104, for example, based on stream metadata (e.g., target filename, offset, and length).

Alternatively, the ranges of the source file represented by F1.0, F1.1, F1.2, and F1.3 may be directly placed at the specified location (e.g., offset, length) within the target file in memory, without having to store these files F1.0, F1.1, F1.2, and F1.3 in a persistent storage device. For each of the replication streams, a checksum may be calculated for the corresponding range at the source storage system and transmitted to the target storage system to allow the target storage system to verify the integrity of the range. The target storage system may further optimize the replication process by opening the base files with parallel range replication. For example, the base file of range F1_range1 and F1_range2 may have a common set of files and these common files are opened just once to preserve system resources at the target storage system. Note that a source starting offset of a range of a source file may be the same as target starting offset of a target file. Alternatively, the source starting offset may be different from the target starting offset. In addition, multiple ranges of multiple source files can be replicated to different locations within a single target file at the target storage system.

Figure 4:
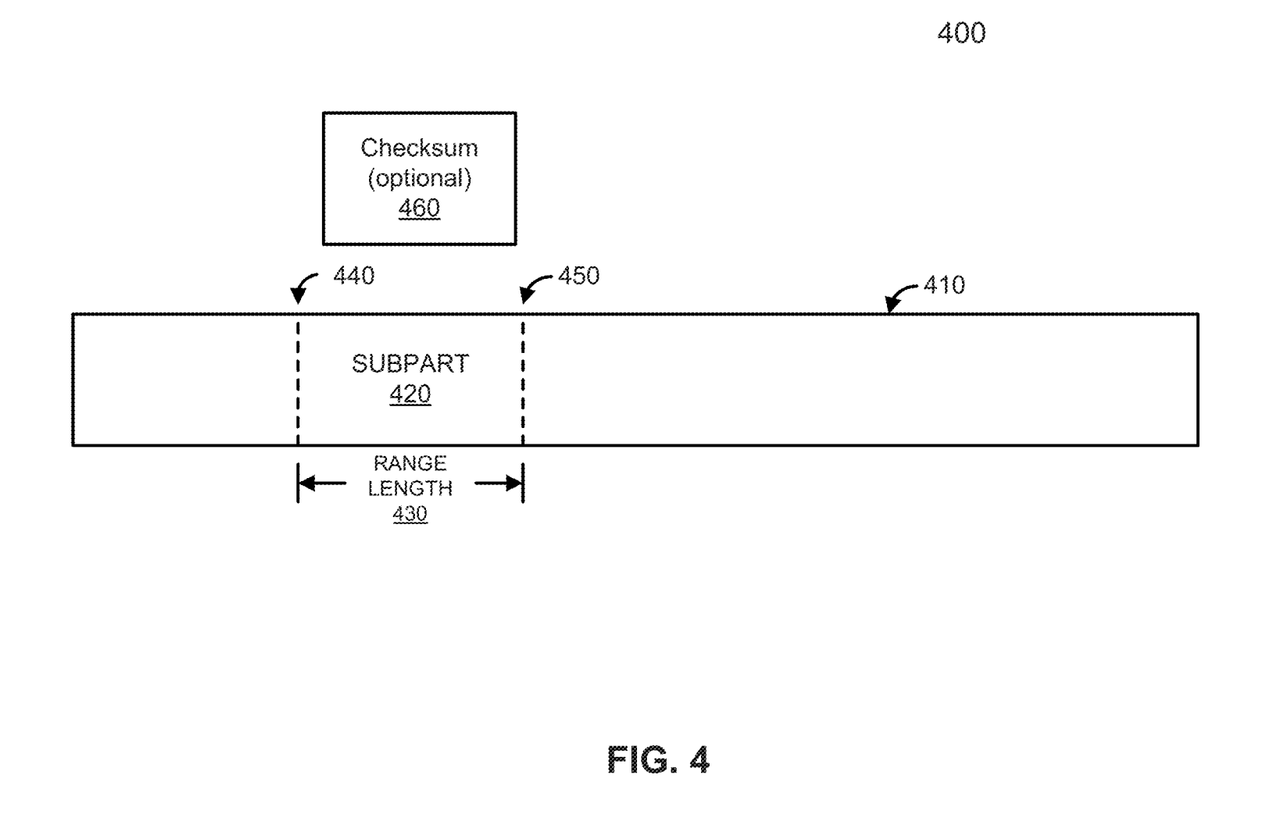
FIG. 4 is a diagram illustrating an example of a source file which can be partitioned into ranges for replication according to one embodiment of the invention.

FIG. 4 is a diagram illustrating an example of a source file which can be partitioned into ranges for replication according to one embodiment of the invention. Referring to FIG. 4, a diagram 400 illustrating a subpart of a source file as specified by a range is shown. A file 410 contains a subpart 420. The continuous subpart 420 of the file 410 (e.g., a range) may be specified in a number of ways. By way of example, the subpart 420 may be specified by the start offset 440 and the range length 430. Alternatively, the subpart 420 may be specified by the start offset 440 and the end offset 450. Of course, it should be appreciated that the range length 430 equals to the difference between the start offset 440 and the end offset 450. An optional checksum 460 may be provided for subpart 420, which may be provided by a client to verify an integrity of subpart 420. If the client requesting the replication already knows checksum 460 of subpart 420, the system or process benefits as this acts as an additional check to avoid mistake.

Figure 5:
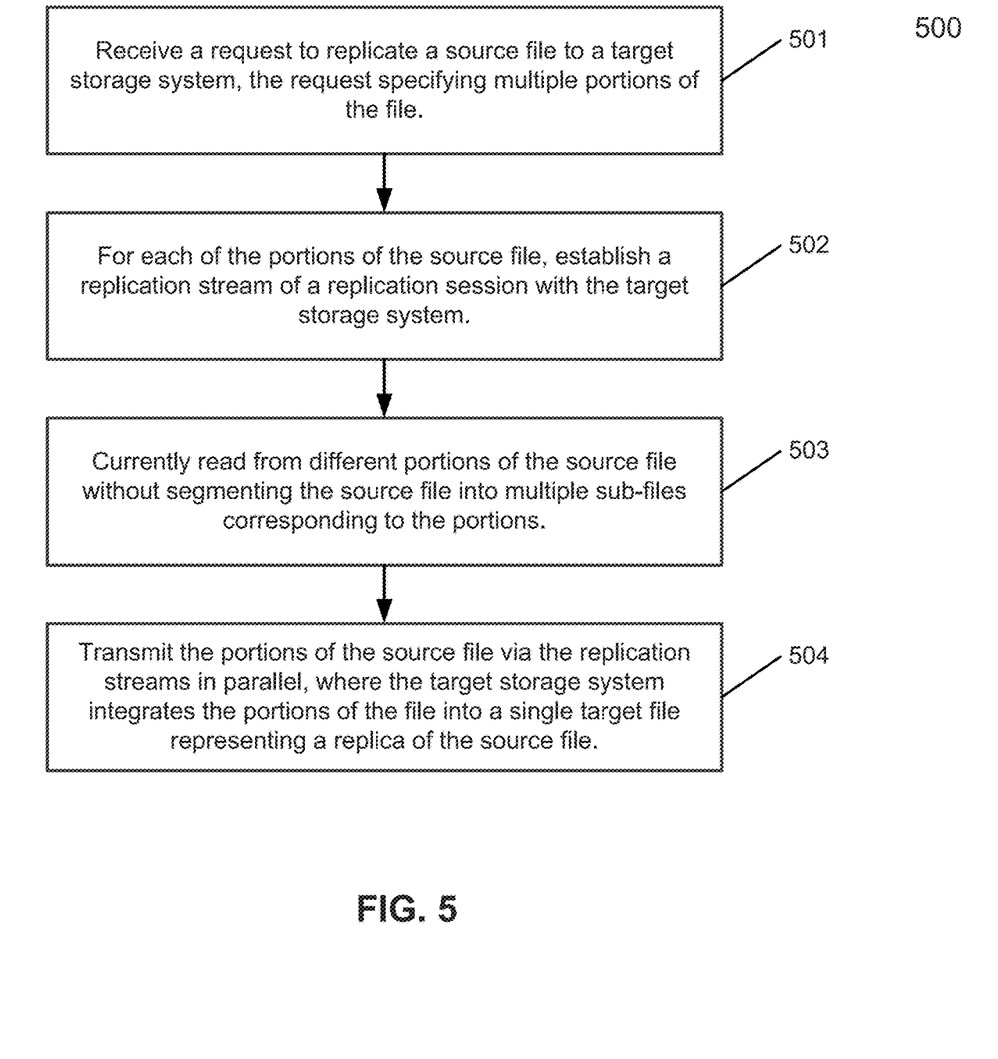
FIG. 5 is a flow diagram illustrating a process of multi-stream replication according to one embodiment of the invention.

FIG. 5 is a flow diagram illustrating a process of multi-stream replication according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by replication module 151 of FIG. 2. Referring to FIG. 5, at block 501, processing logic receives a request to replicate a source file to a target storage system. The request may specify one or more ranges or portions of the source files (e.g., offset, length). At block 502, for each of the ranges of the source file, processing logic establishes a replication stream of a replication session with the target storage system, for example, including communicating the stream metadata with the target storage system (e.g., target file, target offset, length). At block 503, processing logic concurrently read multiple ranges from the source file without having to slicing the source file into separate smaller or sub-files. At block 504, the ranges of the source file are transmitted via the respective replication streams to the target storage system in parallel. The target storage system integrates the ranges of the source file into a single target file as a replica of the source file.

Figure 6:
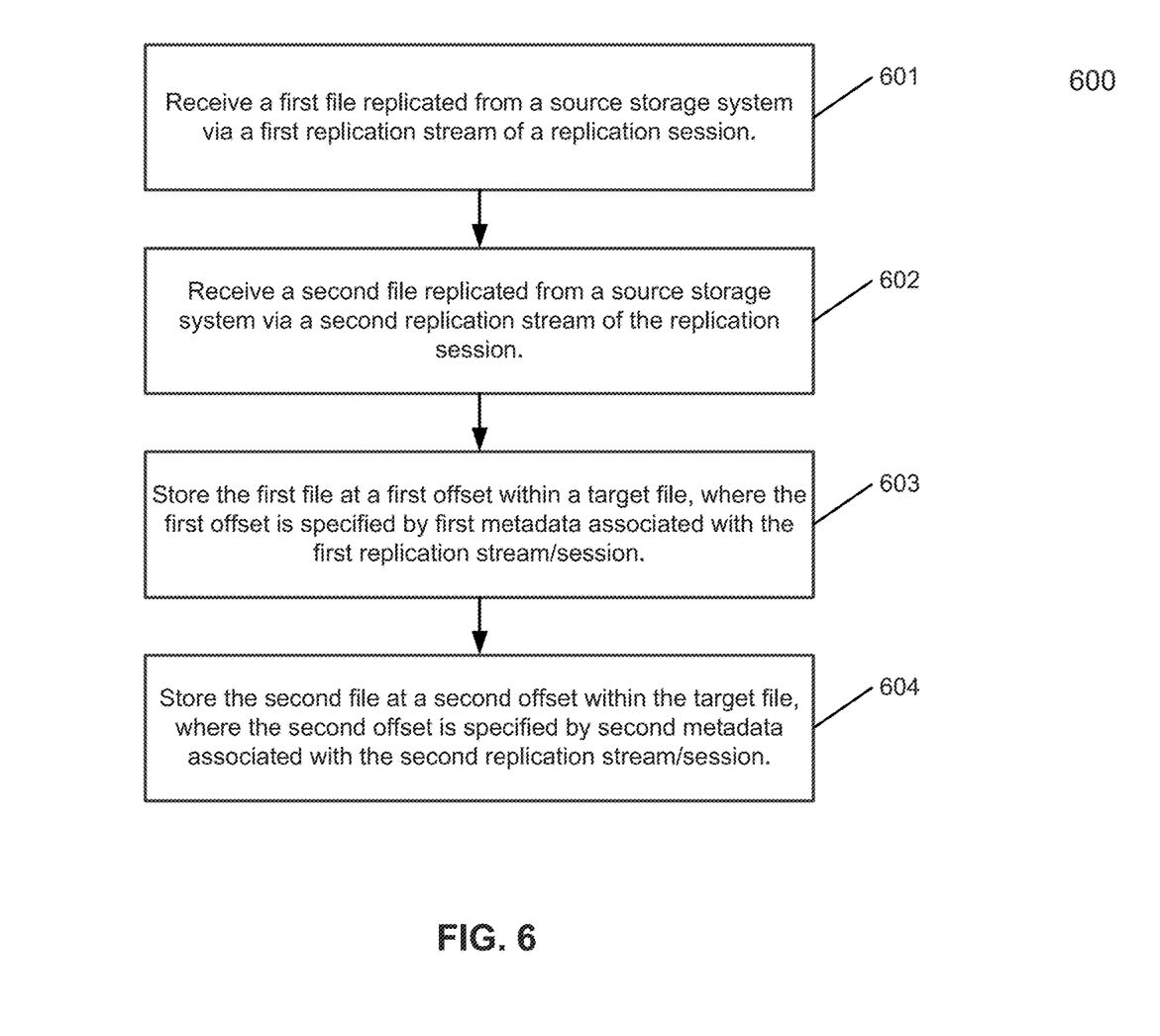
FIG. 6 is a flow diagram illustrating a process of multi-stream replication according to one embodiment of the invention.

FIG. 6 is a flow diagram illustrating a process of multi-stream replication according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by replication module 121 of FIG. 2. Referring to FIG. 6, at block 601, processing logic receives a first file replicated from a source storage system via a first replication stream of a replication session. At block 602, processing logic receives a second file replicated from the source storage system via a second replication stream of the replication session. At block 603, processing logic stores the first file at a first offset within a target file, where the first offset may be specified by first metadata associated with the first replication stream. At block 604, processing logic stores the second file at a second offset within the target file, where the second offset may be specified by second metadata associated with the second replication stream.

Note that some or all of the components as shown and described above (e.g., replication modules as shown in FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
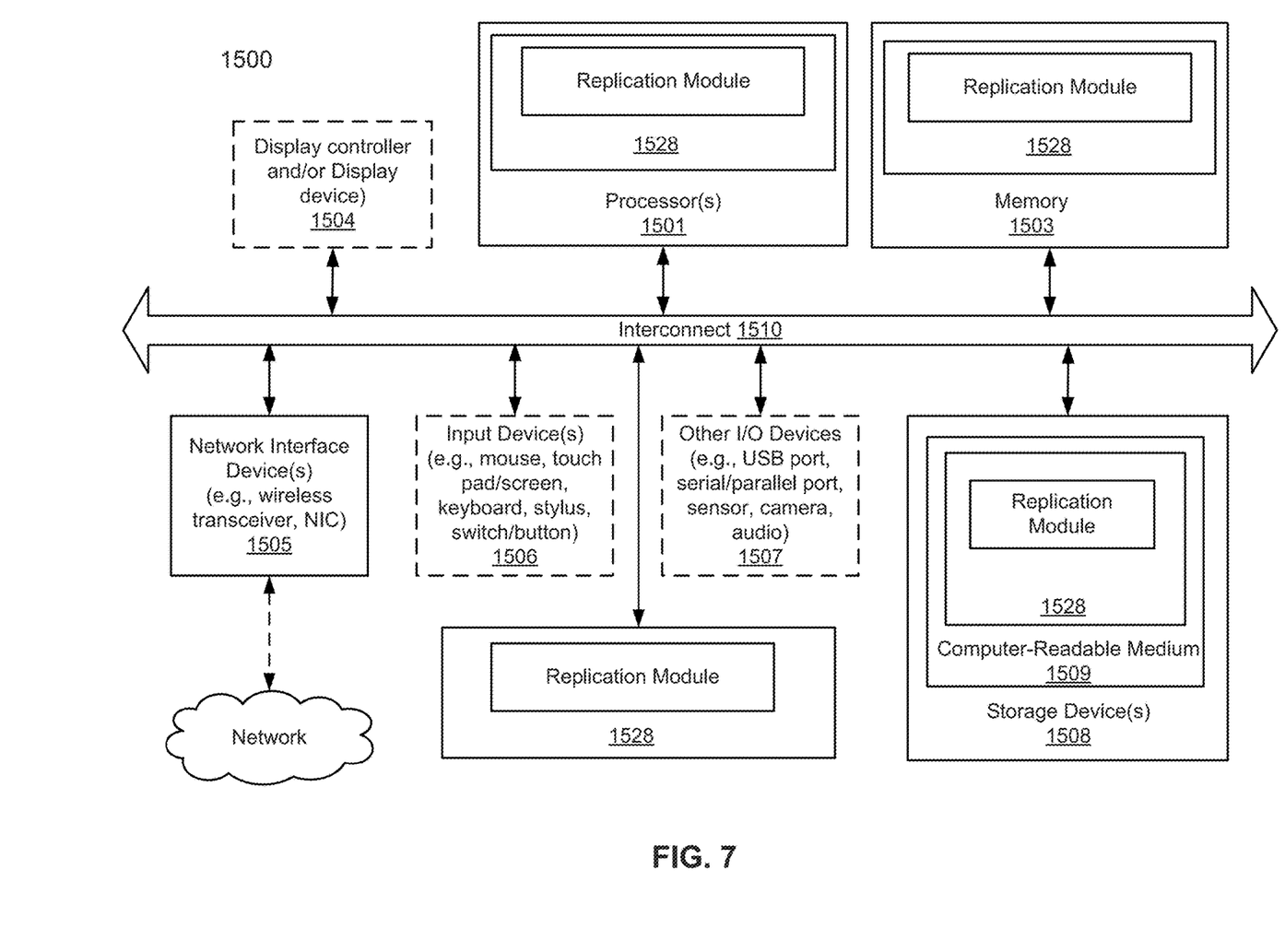
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for replicating data, the method comprising:

receiving a request to replicate a plurality of ranges of a source file from a source storage system to a target storage system, wherein the request specifies a first range of the source file and a second range of the source file, and wherein the source file is a virtual synthetic file formed based on one or more base files;

establishing a first replication stream and a second replication stream of a replication session with the target storage system;

directing reading first data of the first range and second data of the second range from the source file, without creating separate files for storing the first data and the second data, wherein reading the first data and the second data based on the specified first range and the specified second range of the source file, respectively, preserves in the read first and second data, synthesis information of the source file that associates the first and the second data with at least one of the one or more base files based on a base file relationship, wherein the first data and the second data are used to form a single target file at the target storage system representing a replica of the source file, wherein the first data of the first range is obtained from the source file based on a first source offset and a first source length within the source file specified by the request, and wherein the second data of the second range is obtained from the source file based on a second source offset and a second source length within the source file specified by the request, wherein the first data is stored at a first target offset within the target file specified by first stream metadata associated with the first replication stream, and wherein the second data is stored at a second target offset within the target file specified by second stream metadata associated with the second replication stream, wherein the first source offset and the first target offset are different, and wherein the second source offset and the second target offset are different; and transmitting to the target storage system the first data via the first stream and second data via the second stream in parallel, the transmitting further comprising transmitting the preserved synthesis information that associates the first and the second data with the at least one of the one or more base files based on the base file relationship, wherein any of the one or more base files is transmitted to the target storage system only when it is not already present at the target storage system prior to the transmission.

2. The method of claim 1, wherein the first source offset and the first target offset are identical.

3. The method of claim 1, wherein the second source offset and the second target offset are identical.

4. The method of claim 1, wherein the first replication stream further transmits a first checksum of the first data and the second replication stream further transmits a second checksum of the second data to the target storage system to allow the target storage system to verify integrity of the first data and the second data respectively.

5. A non-transitory machine-readable medium having instructions stored therein, which when executed by a processor, cause the processor to perform operations for replicating data from a source storage system to a target storage system, the operations comprising:

receiving a request to replicate a plurality of ranges of a source file from a source storage system to a target storage system, wherein the request specifies a first range of the source file and a second range of the source file, and wherein the source file is a virtual synthetic file formed based on one or more base files;

establishing a first replication stream and a second replication stream of a replication session with the target storage system;

directing reading first data of the first range and second data of the second range from the source file, without creating separate files for storing the first data and the second data, wherein reading the first data and the second data based on the specified first range and the specified second range of the source file, respectively, preserves in the read first and second data, synthesis information of the source file that associates the first and the second data with at least one of the one or more base files based on a base file relationship, wherein the first data and the second data are used to form a single target file at the target storage system representing a replica of the source file, wherein the first data of the first range is obtained from the source file based on a first source offset and a first source length within the source file specified by the request, and wherein the second data of the second range is obtained from the source file based on a second source offset and a second source length within the source file specified by the request, wherein the first data is stored at a first target offset within the target file specified by first stream metadata associated with the first replication stream, and wherein the second data is stored at a second target offset within the target file specified by second stream metadata associated with the second replication stream, wherein the first source offset and the first target offset are different, and wherein the second source offset and the second target offset are different; and transmitting to the target storage system the first data via the first stream and second data via the second stream in parallel, the transmitting further comprising transmitting the preserved synthesis information that associates the first and the second data with the at least one of the one or more base files based on the base file relationship, wherein any of the one or more base files is transmitted to the target storage system only when it is not already present at the target storage system prior to the transmission.

6. The non-transitory machine-readable medium of claim 5, wherein the first source offset and the first target offset are identical.

7. The non-transitory machine-readable medium of claim 5, wherein the second source offset and the second target offset are identical.

8. The non-transitory machine-readable medium of claim 5, wherein the first replication stream further transmits a first checksum of the first data and the second replication stream further transmits a second checksum of the second data to the target storage system to allow the target storage system to verify integrity of the first data and the second data respectively.

9. A data processing system operating as a source storage system, the system comprising: a processor; and a memory coupled to the processor for storing instructions, which when executed by the processor, cause the processor to perform operations of data replication, the operations including: receiving a request to replicate a plurality of ranges of a source file to a target storage system, wherein the request specifies a first range of the source file and a second range of the source file, and wherein the source file is a virtual synthetic file formed based on one or more base files, establishing a first replication stream and a second replication stream of a replication session with the target storage system, directing reading first data of the first range and second data of the second range from the source file, without creating separate files for storing the first data and the second data, wherein reading the first data and the second data based on the specified first range and the specified second range of the source file, respectively, preserves in the read first and second data, synthesis information of the source file that associates the first and the second data with at least one of the one or more base files based on a base file relationship, wherein the first data and the second data are used to form a single target file at the target storage system representing a replica of the source file, wherein the first data of the first range is obtained from the source file based on a first source offset and a first source length within the source file specified by the request, and wherein the second data of the second range is obtained from the source file based on a second source offset and a second source length within the source file specified by the request, wherein the first data is stored at a first target offset within the target file specified by first stream metadata associated with the first replication stream, and wherein the second data is stored at a second target offset within the target file specified by second stream metadata associated with the second replication stream, wherein the first source offset and the first target offset are different, and wherein the second source offset and the second target offset are different, and transmitting to the target storage system the first data via the first stream and second data via the second stream in parallel, the transmitting further comprising transmitting the preserved synthesis information that associates the first and the second data with the at least one of the one or more base files based on the base file relationship, wherein any of the one or more base files is transmitted to the target storage system only when it is not already present at the target storage system prior to the transmission.

10. The system of claim 9, wherein the first source offset and the first target offset are identical.

11. The system of claim 9, wherein the second source offset and the second target offset are identical.

12. The system of claim 9, wherein the first replication stream further transmits a first checksum of the first data and the second replication stream further transmits a second checksum of the second data to the target storage system to allow the target storage system to verify integrity of the first data and the second data respectively.

\* \* \* \* \*